United States Patent [19]

Vries

[11] Patent Number: 4,838,779

[45] Date of Patent: Jun. 13, 1989

[54] APPARATUS FOR A PELLETIZER HAVING HYDRAULICALLY ADJUSTABLE PRESSING ROLLS

[75] Inventor: Hendrikus H. Vries, Herten, Netherlands

[73] Assignee: Van Aarsen Machinefabriek, B.V., Netherlands

[21] Appl. No.: 50,926

[22] Filed: May 15, 1987

[30] Foreign Application Priority Data

May 20, 1986 [NL] Netherlands ........................ 8601270

[51] Int. Cl.[4] .......................... B29C 47/32; B30B 3/06

[52] U.S. Cl. .......................... 425/331; 425/DIG. 230

[58] Field of Search .............. 425/328, 331, DIG. 230

[56] References Cited

U.S. PATENT DOCUMENTS

| | | | |
|---|---|---|---|
| 2,240,660 | 5/1941 | Meakin | 425/331 |
| 3,207,090 | 9/1965 | Cunningham | 425/DIG. 230 |
| 3,354,845 | 11/1967 | Schultz | 425/331 |
| 3,467,031 | 9/1969 | Haflinger | 425/331 |
| 3,551,950 | 1/1971 | Miyakawa et al. | 425/331 |
| 3,679,343 | 7/1972 | Gilman | 425/331 |
| 4,770,621 | 9/1988 | Groebli et al. | 425/331 |

FOREIGN PATENT DOCUMENTS

| | | | |
|---|---|---|---|
| 0231764 | 8/1987 | European Pat. Off. | 435/331 |
| 989603 | 4/1965 | United Kingdom . | |

*Primary Examiner*—Jay H. Woo
*Assistant Examiner*—C. Scott Bushey
*Attorney, Agent, or Firm*—Peter L. Michaelson

[57] ABSTRACT

Apparatus is described for a pelletizer having hydraulically adjustable pressing rolls. Specifically, each pressing roll is mounted in two bearing journals and is eccentrically located with respect thereto. The pelletizer includes a hydraulically actuated device for adjusting the position of the outer surface of the pressing rolls relative to the inner surface of the mold, wherein this device utilizes at least one hydraulic cylinder having an end that is connected to a bearing journal which is, in turn, attached to a shaft of a pressing roll. In addition, the pelletizer also includes a hydraulically actuated device for clamping the rolls into a desired position. Oil supply and discharge pipes for each hydraulic cylinder extend through a main shaft of the pelletizer. Through this apparatus, the position of the pressing rolls can be controllably adjusted while the pelletizer is operating, i.e. while the annular press mold is rotating.

8 Claims, 4 Drawing Sheets

APPARATUS FOR A PELLETIZER HAVING HYDRAULICALLY ADJUSTABLE PRESSING ROLLS

BACKGROUND OF THE INVENTION

1. Field of the Invention

This invention relates to a pelletizer that has a driven annular driveable press mold mounted on a stationary main shaft within a frame and eccentrically mounted hydraulically adjustable pressing rolls located within the mold.

2. Description of the Prior Art

A similar pelletizer is known e.g. from Dutch patent No. 139,111. As disclosed in this patent, the position of each pressing roll is manually adjusted in the direction of the inner surface of the press mold. To that end, a hexagonal shoulder is disposed on a bearing journal of each pressing roll. A nut spanner can be placed on this shoulder.

Another drawback of the manual adjustment of the pressing roll is that this adjustment can take place only with an inoperative pelletizer. A further drawback is that the correct setting of the pressing roll relative to the mold can only be obtained through a trial and error method, since the correct setting of the pressing roll can only be determined experimentally with the pressed product. In fact, the correct placement of the pressing roll depends upon the material to be processed by the pelletizer.

SUMMARY OF THE INVENTION

It is an object of the present invention to remove these drawbacks and to provide a pelletizer in which the pressing rolls can be adjusted while the pelletizer is in operation and, moreover, in such a manner that for a given material to be processed the correct position of the pressing rolls is immediately adjustable. The pelletizer according to the present invention is characterized, to that end, in that the adjustment device includes at least one hydraulic adjustment cylinder having an end connected to a bearing journal of the pressing roll shaft, while the oil supply and discharge pipes of each hydraulic adjustment cylinder extend through the main shaft of the pelletizer.

Preferably, each pressing roll is adjustable by means of an associated adjustment cylinder whose piston rod engages with the adjustment crank of the pressing roll and the other end is fixedly connected to a stationary spacer plate provided within the press mold.

Hydraulic adjustment of the pressing rolls has the advantage that adjustment of the pressing rolls can take place when the pelletizer is in operation. Moreover, the pressure supplied to an adjustment cylinder is indicative of the force with which the outer surface of the pressing roll presses against the inner surface of the annular mold. When the material to be processed by the pelletizer is changed, only an experimentally established oil pressure needs to be supplied to the hydraulic adjustment cylinders in order to obtain for that material the optimum position of the pressing rolls relative to the annular mold. By having the oil supply and discharge pipes of each hydraulic cylinder extend through the main shaft of the pelletizer, sealing problems that would occur, if pipes should extend through the cover closing one side of the annular press mold, are avoided. Moreover, one side of the pelletizer is kept entirely free, thereby allowing easy access to the filling end of the mold for operation and maintenance purposes.

Inasmuch as the hydraulic adjustment cylinders can be kept under pressure, the pressing rolls remain in their proper position during compaction of the material. Preferably, each pressing roll is provided with an hydraulic clamping device for fixing the roll in a given position after its adjustment. Such a hydraulic clamping device consists of a tie rod that extends coaxially with the bearing journals through the pressing roll. The tie rod is provided on the main shaft end with a cup-shaped nut whose edge can be pressed against wedge-shaped bearing brasses mounted about the bearing journal of a pressing roll. At the other side of the pressing roll, a hydraulically operated servo piston is provided on the tie rod through which the tie rod can be subjected to a tensile load.

By applying wedge-shaped bearing brasses, a proper fixation of the pressing roll in a given position can be obtained, while the clamping effect can be easily operated by means of a small servo piston.

Because the stroke of the hydraulic cylinder is usually smaller than the admissible wear of the surfaces of the pressing rolls and the annular mold, it is desirable to have the possibility of adapting the adjustment range to the extent of wear that occurs over time. Preferably and to that end, the bearing journal of the pressing roll shaft which is located remote from the main shaft, is provided with a polygonal shoulder. The adjustment crank is provided internally with a correspondingly formed cut-out. The mounting arrangement is such that the adjustment crank can be placed in different positions on the polygonal shoulder.

In this manner, the entire adjustment range of the pressing roll can be traversed in the event of a small stroke of the adjustment cylinder. The magnitude of the adjustment range of the pressing roll is determined by the extent of eccentricity of the pressing roll shaft.

BRIEF DESCRIPTION OF THE DRAWINGS

One embodiment of the pelletizer according to the present invention will now be described, by way of example, with reference to the accompanying drawings, in which.

DETAILED DESCRIPTION

Figure 1:
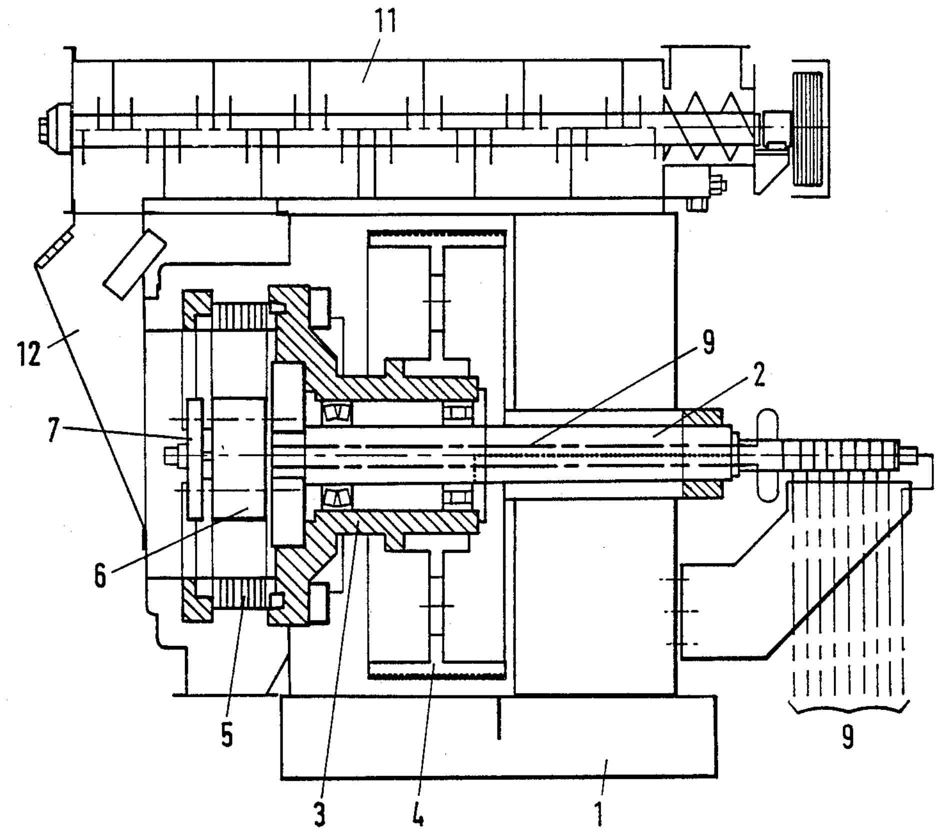
FIG. 1 is a longitudinal diagrammatic section of the pelletizer.
Figure 2:
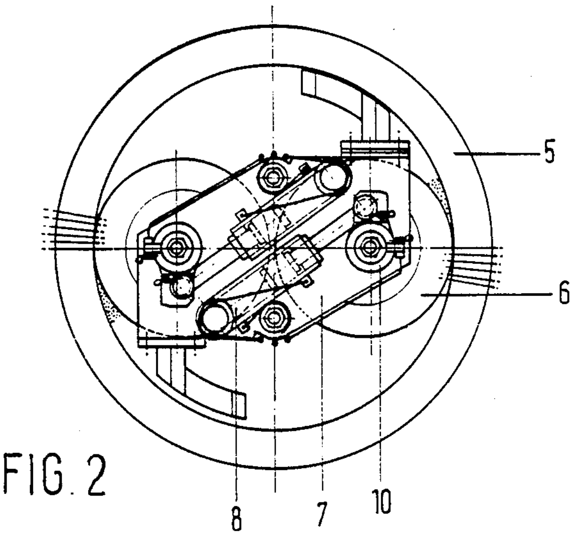
FIG. 2 is a side view of the annular press mold with the pressing rolls mounted therein and the adjustment device therefor.

FIGS. 1 and 2 collectively show the main components of the pelletizer, consisting of frame 1 wherein main shaft 2 is mounted in a stationary relationship thereto. Annular mold 5 is attached to mold holder 3 which, in turn, is mounted on main shaft 2. Mold holder 3 is connected to drive wheel 4 which is driven by a motor, not shown, through means of vee ropes. Within annular mold 5 are provided two pressing rolls 6 mounted on the one hand in main shaft 2 and on the other hand in spacer plate 7 which, in turn, is connected to main shaft 2 by means of two rods. Two hydraulic adjustment cylinders 8, one for each pressing roll 6, are mounted in spacer plate 7. The construction and operation thereof will be further explained hereinafter in conjunction with FIG. 4. Each pressing roll 6 is provided with hydraulic clamping device 10 to be explained hereinafter in conjunction with FIG. 3. Material supply device 11 is mounted above annular mold 5 and rests on frame 1 of the pelletizer. The material supply device includes a diagrammatically shown transport-/mixing mechanism supplying the material to be processed to feed hopper 12 which is, in turn, connected to the annular mold 5. The grains compacted by the annular mold are discharged via a chute located at the bottom of mold 5.

A. The hydraulic clamping device

Figure 3:
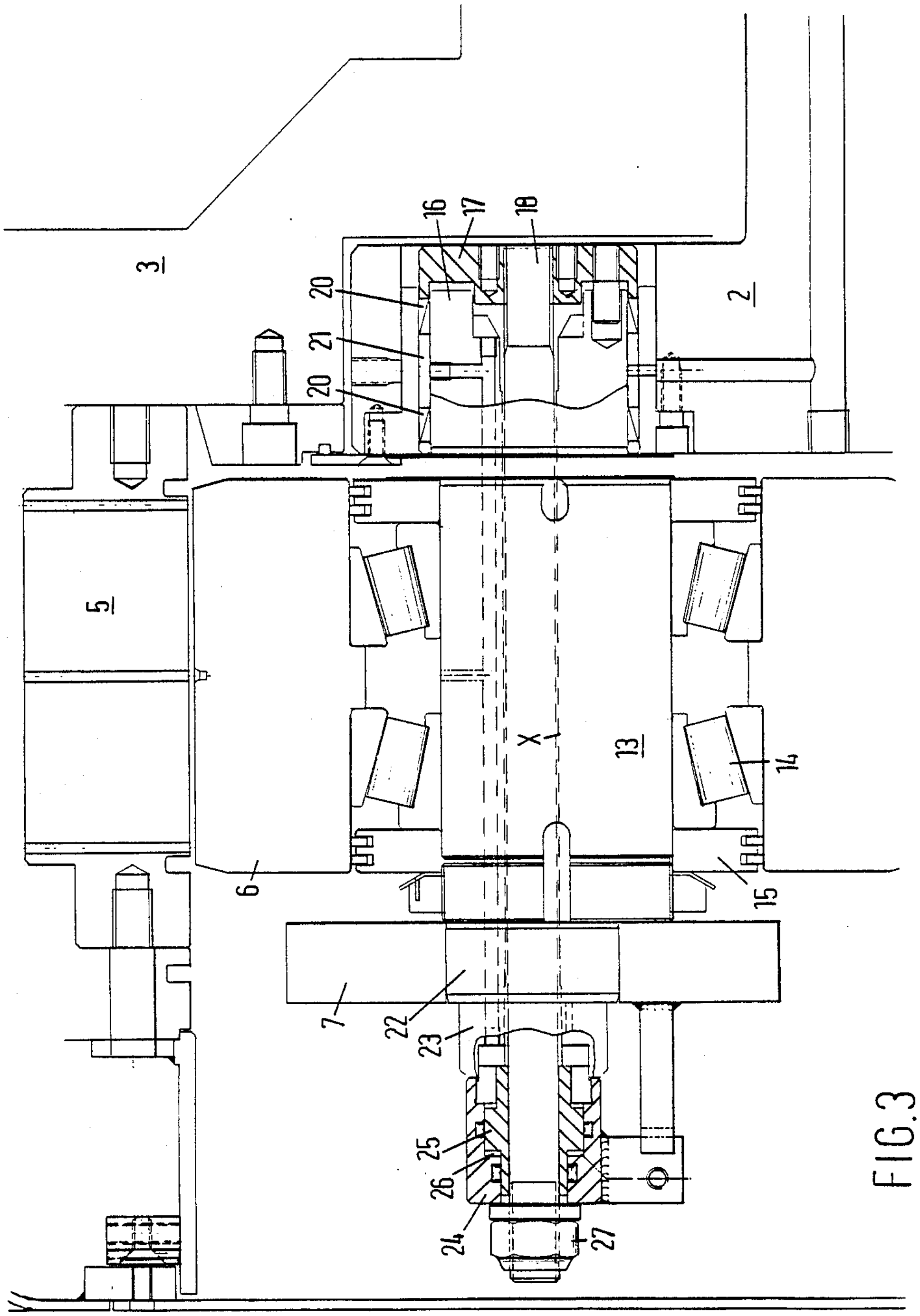
FIG. 3 is a longitudinal section of a pressing roll.

FIG. 3 shows pressing roll 6 abutting against annular press mold 5. This mold is mounted, via partially shown mold holder 3, in the frame of the pelletizer and specifically on main shaft 2 which is also partially shown. Pressing roll 6 is mounted on pressing roll shaft 13 by means of roller bearings 14 with the axis of shaft 13 indicated by label "X". Shaft 13 is eccentrically located relative to two bearing journals 16 and 22. Journal 16 is placed in a cut-out located in stationary main shaft 2. Journal 22 rests in a cut-out provided in spacer plate 7. Tie rod 18 extends through journals 16 and 22 and projects from spacer plate 7. Cup-shaped nut 17 is secured to an end of tie rod 18 that faces main shaft 2. An edge of this nut whose faces pressing roll 6 abuts against two wedge-shaped ring clamping segments 20 which are shown in cross-section in FIG. 3. A second set of wedge-shaped clamping segments 20 is mounted at a left end of journal 16. Intermediate ring 21 is placed axially between the wedge-shaped clamping segments. The leftmost wedge-shaped ring in the leftmost wedge-shaped camping segments abuts against a shoulder provided on pressing roll shaft 13.

Polygonal shoulder 23, the function of which will be explained hereinafter, is mounted on journal 22. Cap 24 is screwed onto the left end of tie rod 18. Chamber 26 which is formed from a recess in cap 24 accommodates servo piston 25. Cap 24 is held down by means of nut 27 which is provided on the left end of tie rod 18.

To prevent bearings 14 of pressing roll 6 from contacting the material to be pelletized, the side walls of pressing roll 6 are provided with sealing plates 15.

The hydraulic clamping device, i.e. hydraulic clamping device 10 shown in FIG. 1, operates as follows: When pressing roll 6 is to be adjusted, the oil pressure between cap 24 and servo piston 25 is relieved, allowing the servo piston to move in the direction of cap 24 (in FIG. 3 to the left), thereby creating room for tie rod 18 to move to the right. In this manner the edge of cup-shaped nut 17 is released from wedge-shaped clamping segments 20, so that these segments are no longer clamped onto each other. As such, bearing journal 16 is no longer clamped within main shaft 2.

In the manner to be described hereinafter, polygonal shoulder 23, connected to journal 22, is then rotated so that eccentric pressing roll shaft 13 occupies a different position whereby the circumferential surface of roll 6 is moved towards or away from the inner wall of mold 5. After this adjustment of roll 6 is made, pressure is supplied to chamber 26 situated between cap 24 and servo piston 25. Servo piston 25 is thereby pressed to the right until it abuts against polygonal shoulder 23. As such, cap 24 is pressed to the left in FIG. 3, thereby exerting a tensile force onto tie rod 18. As a result, wedge-shaped clamping segments 20 of cup-shaped nut 17 are pressed onto each other, thus ensuring a clamping of journal 16 in stationary main shaft 2. Consequently, pressing roll 6 is thus clamped in its newly adjusted position.

B. The adjustment device for the pressing roll

Figure 4:
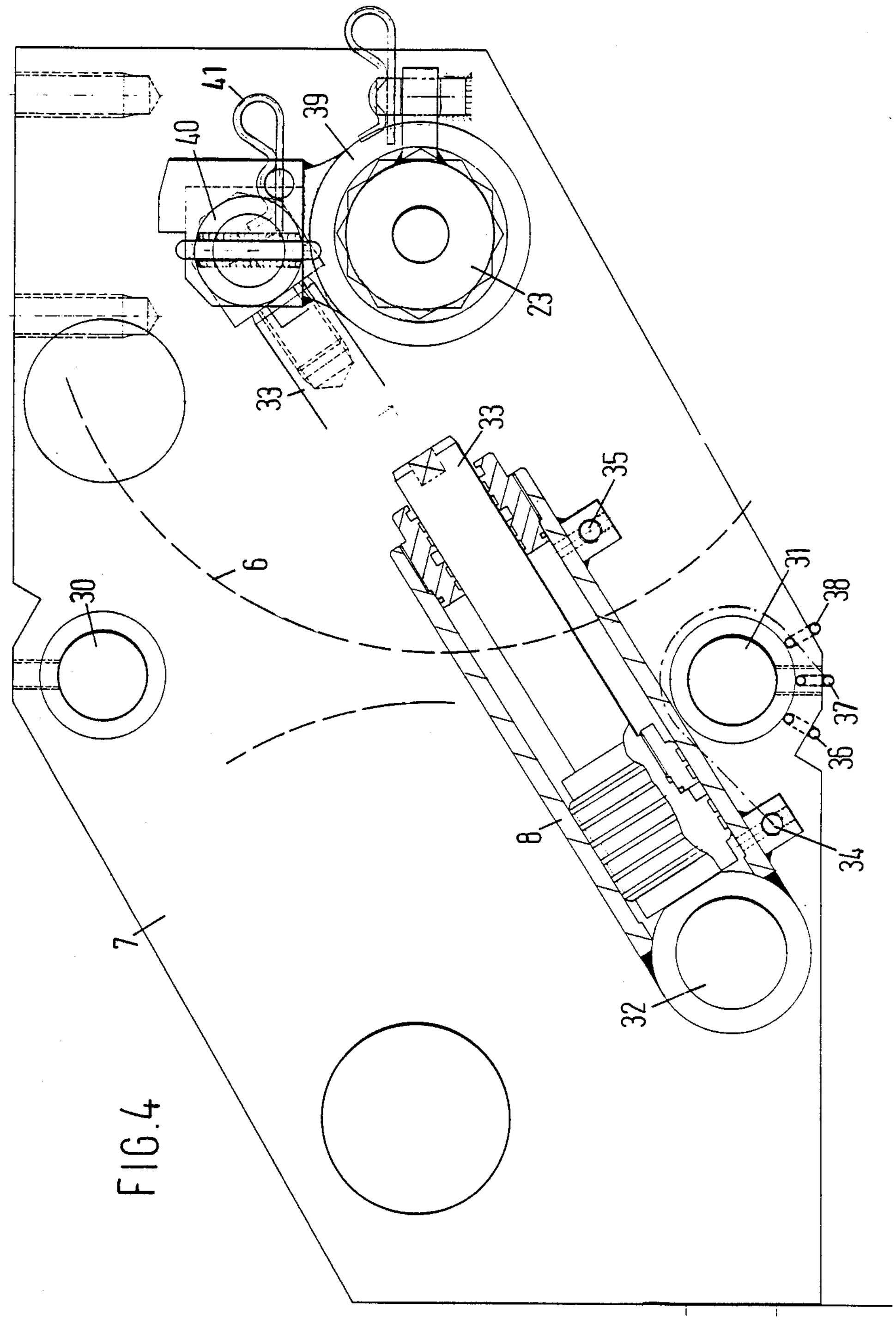
FIG. 4 shows the adjustment device for one pressing roll and depicted in two extreme positions.

FIG. 4 shows a front view of spacer plate 7 on which only one adjustment cylinder 8 is mounted. For the sake of clarity, the other cylinder has been omitted from this figure. As shown, one end of adjustment cylinder 8 is pivotally mounted on attachment journal 32 which, in turn, is fixedly connected to spacer plate 7. Piston rod 33 exists within the cylinder. The free end of this rod is connected to crank 39. This crank has a polygonal internal shape so as to matingly fit on polygonal shoulder 23 connected to journal 22 of pressing roll shaft 13 (see also FIG. 3). Piston rod 33 is shown in FIG. 4 in its most retracted position in adjustment cylinder 8. The position that is shown for crank 39 corresponds to the most extended position of piston rod 33. Adjustment cylinder 8 is provided with two oil inlets 34 and 35 for moving the piston of adjustment cylinder 8 in the desired direction. Shown at the underside of spacer plate 7 are three oil pipes 36, 37 and 38, two of which are connected (though not specifically shown to simplify the drawing) to inlets 34 and 35 of adjustment cylinder 8. Oil pipe 38 is connected (again not specifically shown to simplify the drawing) to chamber 26 of servo piston 25 shown in FIG. 3 for operating the clamping device. As shown in FIG. 4, spacer plate 7 is connected with two attaching rods 30 and 31 to the front face of main shaft 2 (also see FIG. 1). As shown in FIG. 4, piston rod 33 of adjustment cylinder 8 is pivotally connected to adjustment crank 39 by means of connecting pin 40 suitably secured in the crank by means of split pin 41.

Adjustment cylinder 8 is adapted to swivel adjustment crank 39 through an angle of about 70°. The circumference of pressing roll 6 can thus be displaced along a distance of X mm in the direction of the inner circumference of the press mold. Because, during pelletizing material, pressing rolls 6 may be subjected to more wear than X mm at their outer surface and at the inner surface of mold 5, the position of adjustment crank 39 relative to the polygonal shoulder 23 should be variable.

In the embodiment shown, polygonal shoulder 23 has an external dodecagonal shape, which also applies to an internal shape of adjustment crank 39. Consequently, crank 39 can be placed in twelve positions on the polygonal shoulder 23 so that there is an ample choice for the desired adjustment range of the pressing rolls.

As shown in FIG. 2, the second pressing roll is adjusted identically by use of an identical adjustment cylinder 8 mounted on spacer plate 7 in an inverse symmetrical relationship to the adjustment cylinder shown in FIG. 4.

C. Hydraulic pipes

Figure 5B:
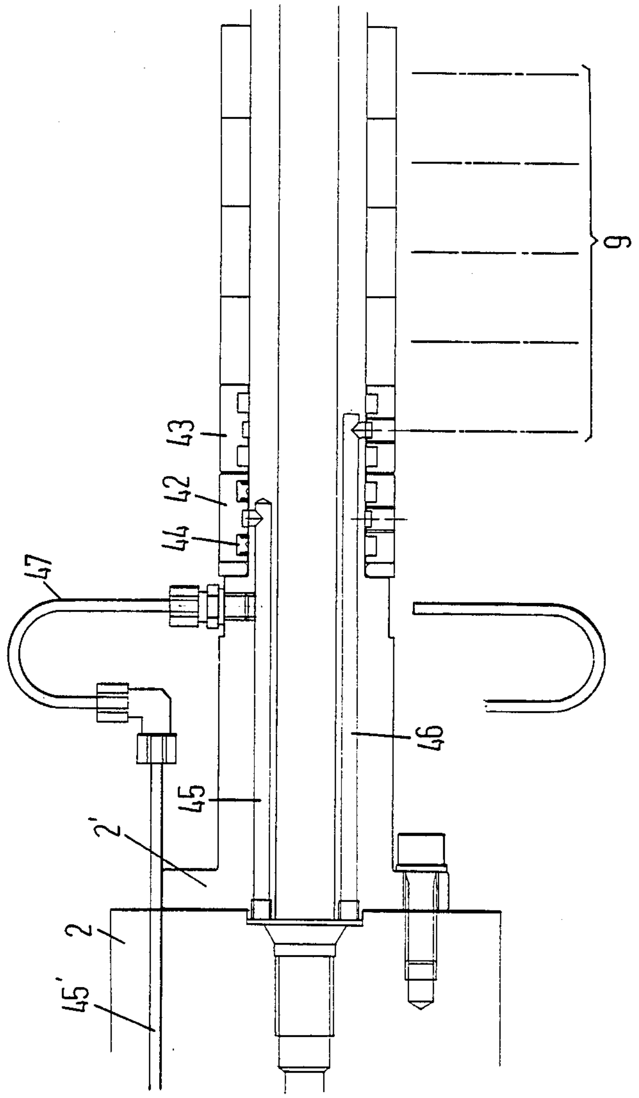
FIG. 5 shows the connection of the different hydraulic pipes to the main shaft of the pelletizer, in which FIG. 5*a* specifically depicts a right end of main shaft 2, shown in FIG. 1, and FIG. 5*b* specifically depicts a slip ring assembly connected to the right end of main shaft 2.

FIG. 1 shows in dotted lines, at the right end of the pelletizer, oil pipes which subsequently extend horizontally through main shaft 2. The connection of the oil pipes to the pelletizer is shown in detail in FIG. 5.

Main shaft 2 is stationary. However, in the event that the case of the pelletizer seizes, mold 5 may be entrained. Consequently, the different oil pipes have to be connected to main shaft 2 by means of slip rings. If this was not the case, then all the hydraulic pipes would be fractured in the event the pelletizer seizes and the main shaft rotates.

Figure 5A:
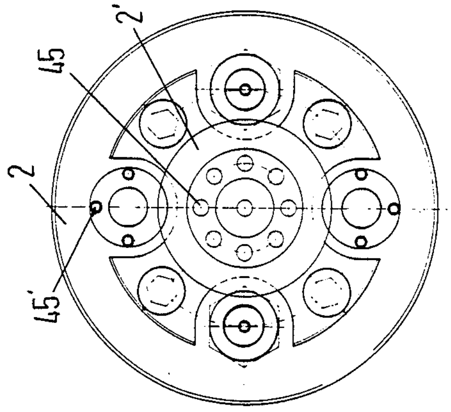

As specifically shown in FIG. 5*a*, extension piece 2′ has a smaller diameter than main shaft 2 and is screwed onto the end of the main shaft. The extension piece accommodates a central oil channel and eight oil pipes uniformly distributed over a circle, wherein two of these pipes are illustratively indicated in FIG. 5*b* as pipes 45 and 46. Except for the central oil pipe, the eight other oil pipes are plugged at the end of extension piece 2′. Pipe 45 terminates in an annular channel of slip ring 42 and is sealed on both ends of the slip ring by seals 44. Channel 46 terminates in an annular oil channel of slip ring 43 which is sealed in an identical fashion. All other oil channels provided in extension piece 2′ are connected in an identical fashion to the remaining slip rings which are indicated diagrammatically.

Because the oil pipes in main shaft 2 are situated at a larger interspace from the axis of the shaft than in extension piece 2′ each oil pipe, such as illustratively oil pipes 45 and 46, is connected through by-pass 47 to a corresponding oil channel, such as illustratively channel 45′, that is provided in the main shaft. FIG. 5*a* shows the course of the oil pipes in extension piece 2′, as well as the course of the associated pipes in main shaft 2. Three oil pipes serve in lubricating the main bearing and the bearings of pressing rolls 6. Two oil pipes extend towards adjustment cylinder 8, while for each clamping device 10 (see FIG. 1) an oil pipe also passes from the connection point on extension piece 2, through main shaft 2 to spacer plate 7.

I claim:

1. A continuously operating pelletizer comprising:

an annular press mold mounted on a stationary main shaft located within a frame;

a supply hopper for feeding material into said press mold;

pressing rolls located within said mold such that an outer surface of each of said pressing rolls cooperates with an inner surface of said pressing mold to pelletize said material, wherein at least one of the pressing rolls is mounted on a pressing roll shaft that rotates between a pair of bearing journals and said one pressing roll is capable of being rotatively driven by said press mold, and wherein the pressing roll shaft is eccentrically oriented relative to the bearing journals;

means for adjustably varying a position of said one pressing roll relative to said annular press mold, wherein said adjustably varying means has at least one hydraulic adjustment cylinder in which one end of said hydraulic adjustment cylinder engages with an adjustment crank connected to one of said bearing journals so as to be capable of rotating said pressing roll shaft in order to move said outer surface of said one pressing roll towards or away from said inner surface of said mold; and hydraulic supply and discharge pipes which extend through the main shaft of the pelletizer and are connected to said hydraulic cylinder.

2. The pelletizer in claim 1 wherein said adjustably varying means comprises a separate hydraulic adjustment cylinder associated with each one of said pressing rolls, wherein an end of a piston associated with each one of said cylinders engages with an adjustment crank associated with a corresponding one of said pressing rolls and an opposite end of said cylinder is fixedly connected to a stationary plate provided within said press mold.

3. The pelletizer in claims 1 or 2 further comprising means, associated with each one of said pressing rolls, for hydraulically clamping each of said pressing rolls into a selected position.

4. The pelletizer in claim 3 wherein the hydraulic clamping means comprises:

a tie rod coaxially aligned with and extending through an associated one of said pressing rolls and the bearing journals associated therewith;

wedge-shaped bearing brasses situated about the bearing journal located at a side of said associated pressing roll that faces the main shaft;

a cup shaped nut situated at an end of said tie rod that faces said main shaft, wherein an edge of the nut can be pressed against said wedge-shaped bearing brasses; and an hydraulically operated servo piston mounted on an end of said tie rod situated at an opposite side of said pressing roll for subjecting the tie rod to a tensile force so as to move the edge of said nut against said bearing brasses.

5. The pelletizer in claim 1 wherein the bearing journal that is remotely situated from the main shaft is provided with a polygonal shoulder and wherein the adjustment crank is connected to said remotely situated bearing journal and has a correspondingly formed internal cut-out such that the adjustment crank can be placed in different positions on said polygonal shoulder.

6. The pelletizer in claim 2 wherein the bearing journal that is remotely situated from the main shaft is provided with a polygonal shoulder and wherein the adjustment crank is connected to said remotely situated bearing journal and has a correspondingly formed internal cut-out such that the adjustment crank can be placed in different positions on said polygonal shoulder.

7. The pelletizer in claim 3 wherein the bearing journal that is remotely situated from the main shaft is provided with a polygonal shoulder and wherein the adjustment crank is connected to said remotely situated bearing journal and has a correspondingly formed internal cut-out such that the adjustment crank can be placed in different positions on said polygonal shoulder.

8. The pelletizer in claim 4 wherein the bearing journal that is remotely situated from the main shaft is provided with a polygonal shoulder and wherein the adjustment crank is connected to said remotely situated bearing journal and has a correspondingly formed internal cut-out such that the adjustment crank can be placed in different positions on said polygonal shoulder.

* * * * *